US012760572B2

(12) United States Patent
Hsu et al.

(10) Patent No.: US 12,760,572 B2
(45) Date of Patent: Oct. 13, 2026

(54) TORQUE MODULE FOR HINGE DEVICE

(71) Applicant: FOSITEK CORPORATION, New Taipei City (TW)

(72) Inventors: An Szu Hsu, New Taipei City (TW); An-Wei Chung, New Taipei City (TW)

(73) Assignee: Fositek Corporation, New Taipei City (TW)

( * ) Notice: Subject to any disclaimer, the term of this patent is extended or adjusted under 35 U.S.C. 154(b) by 0 days.

(21) Appl. No.: 18/816,555

(22) Filed: Aug. 27, 2024

(65) Prior Publication Data

US 2025/0382835 A1 Dec. 18, 2025

(30) Foreign Application Priority Data

Jun. 17, 2024 (TW) ................................ 113122396

(51) Int. Cl.
*E05D 11/08* (2006.01)

(52) U.S. Cl.
CPC .................................. *E05D 11/082* (2013.01)

(58) Field of Classification Search
CPC .. E05D 3/12; E05D 3/18; E05D 3/122; E05D 3/06; E05D 3/10; E05D 7/0045; E05D 11/087; E05D 11/08; E05D 11/081; E05D 11/082; E05D 11/1078; E05D 2011/085; E05D 2007/0072; G06F 1/1681; G06F 1/1616; G06F 1/1618; G06F 1/1652; G06F 1/168; E05Y 2900/606; E05Y 2900/602; E05Y 2999/00; E05Y 2201/218; E05Y 16/354; E05Y 16/366–371; E05Y 16/34; E05Y 16/342; E05Y 16/337; H04M 1/0214; H04M 1/0216; H04M 1/0222; H04M 1/022; H04M 1/0268; H05K 5/0226; F16C 11/04; F16C 11/10
See application file for complete search history.

(56) References Cited

U.S. PATENT DOCUMENTS

| | | | | |
|---|---|---|---|---|
| 12,063,319 B2 * | 8/2024 | Wu | ........................ | G06F 1/1681 |
| 2017/0275935 A1 * | 9/2017 | Shang | ................... | F16C 11/045 |

(Continued)

FOREIGN PATENT DOCUMENTS

| | | | | |
|---|---|---|---|---|
| CN | 113883156 A | * 1/2022 | ........... | H05K 5/0226 |
| CN | 115494913 A | * 12/2022 | ............. | F16C 11/10 |

(Continued)

*Primary Examiner* — Chuck Y Mah
(74) *Attorney, Agent, or Firm* — Rosenberg, Klein & Lee

(57) ABSTRACT

A torque module for hinge device includes a holding support having two pivotal connection sections respectively having a pin extended therethrough, and two pairs of swing arms pivotally fitted on the pins to extend parallelly with each other and contact with two axially opposite sides of the pivotal connection sections with a gap (A) formed between them. Elastic elements are fitted on the pins to elastically press the pivotal connection sections toward at least one of the two pairs of swing arms for them to firmly and frictionally clamp to the two axially opposite sides of the pivotal connection sections and accordingly, provide a torque that can always hold the swing arms in place relative to the pivotal connection sections, no matter how the swing arms in each pair are pivotally turned relative to each other about the pivotal connection sections to any folded or extended angular position.

19 Claims, 8 Drawing Sheets

(56) References Cited

U.S. PATENT DOCUMENTS

| | | | | |
|---|---|---|---|---|
| 2021/0165466 A1* | 6/2021 | Kang | ..................... | G06F 1/1616 |
| 2023/0093901 A1* | 3/2023 | Hsu | ........................ | G06F 1/1616<br>361/679.01 |
| 2023/0213056 A1* | 7/2023 | Han | ....................... | G06F 1/1656<br>455/575.3 |
| 2025/0126730 A1* | 4/2025 | Shen | ...................... | G06F 1/1681 |

FOREIGN PATENT DOCUMENTS

| | | | | | |
|---|---|---|---|---|---|
| CN | 115217837 B * | 4/2024 | .............. | F16C 11/04 |
| WO | 2023/124460 A1 | 7/2023 | | |

* cited by examiner

TORQUE MODULE FOR HINGE DEVICE

FIELD OF THE INVENTION

The present invention relates to a torque module for hinge device, and more particularly, to a torque module that enables two swing arm assemblies to firmly and frictionally clamp to two axially opposite sides of a holding support, so that a torque can always be provided for locating two swing arms in each of the swing arm assemblies in place on the holding support, no matter how the two swing arms are bent or folded relative to each other.

BACKGROUND OF THE INVENTION

FIG. 1 is a fragmentary, assembled sectional side view of a conventional hinge mechanism applied to a flexible display of an electronic device. The hinge mechanism includes a holding support 1, two swing arms 20, elastic elements 5, and cam holders 400. The holding support 1 has two pivotal connection sections 11, which respectively have a pin 14 extending therethrough. The two swing arms 20 respectively include a mating pivotal connection section 201, which is provided with a recess 202 for engaging with the pivotal connection section 11. The pins 14 extend through the mating pivotal connection sections 201 and the pivotal connection sections 11, such that the swing arms 20 are pivotally connected to the holding support 1. The elastic elements 5 drive the two cam holders 400 to press against two axially opposite sides of the swing arms 20. The cam holders 400 and the swing arms 20 are correspondingly provided with a plurality of cams. When the cams on the swing arms 20 and the cam holders 400 are elastically engaged with one another, the two swing arms 20 can be located in place relative to the holding support 1 when the swing arms 20 are folded or expended to include one of some specific angles between them, such as zero, 90, or 180 degrees.

However, since the recesses 202 on the swing arms 20 are fixed in width, an elastic force applied by the elastic elements 5 to the swing arms 20 via the two cam holders 400 does not act on the mating pivotal connection sections 201 and the pivotal connection sections 11 to produce increased friction between them. As a result, no sufficient torque or frictional force can be provided for the two swing arms 20 to exactly stop relative to the holding support 1 at angles other than those specific angles. Accordingly, the flexible display could not be freely extended to any desired angular position and is subjected to limit and inconvenience in practical application.

China Utility Model Patent No. CN 220581489U discloses a hinge and electronic device using the same. The hinge includes two virtual-shaft holding supports respectively pivotally connected to a first base, and two real-shaft holding supports respectively pivotally connected to a second base; a synchronizer is provided between two corresponding first and second bases; a synchronizing holding support is provided between two corresponding virtual-shaft and real-shaft holding supports; real shafts are provided on outer sides the two second bases to extend through the second bases, the synchronizers, and the first bases; a compression spring is provided on each of the real shafts to press against the real-shaft and the synchronizing holding supports via two meshing gears; and the real-shaft holding supports driven by the meshing gears can be brought by the synchronizing holding supports to turn pivotally along with the virtual-shaft holding supports.

The above described prior art hinge mechanism has the following disadvantages in practical application thereof:

(1) The virtual-shaft holding supports are brought by the synchronizing holding supports to move along with the real-shaft holding supports. Therefore, the first bases are separated from the synchronizing holding supports, the real-shaft holding supports, the second bases and the compression springs, and the elastic force of the compression springs could act on the virtual-shaft holding supports and the first bases to increase a frictional force between them. As a result, the virtual-shaft holding supports can only pivotally turn along with the real-shaft holding supports to stop at several predetermined specific folding or expanding angles, i.e. corresponding to the positions at where the two gears are meshed with each other at their tops. In other words, the hinge mechanism could provide sufficient torque or frictional force for holding it to other folding or expending angular positions. Therefore, the conventional hinge mechanism does not allow for freely folding or expending to any desired angular position and has limit in the practical application thereof.

(2) The synchronizers and the second bases are sequentially located at two lateral sides of the first bases. When the two meshing gears act on the second bases, the second bases and the real-shaft holding supports would slide (i.e. change in positions) along an axial direction of the real shafts. This situation makes a combination of the real-shaft holding supports with other related plate members (such as an outer case) much more complicate in structure and being apt to loosen from each other.

Chinese invention patent No. CN114762025A discloses a foldable electronic device including hinge assembly, which includes a first and a second shaft parallelly arranged on a holding support to move synchronously. The first and the second shaft are pivotally connected to a first and a second arm, respectively; and the first and the second arm respectively have a bracket coupled to one side thereof. The first and the second shaft respectively have a first and a second spring fitted thereon, and the first and the second spring are pressed against the first and the second arm via a pawl plate, such that a first and a second cam on the first and the second arm, respectively, are partially tightly pushed against a rotational mechanism.

In practical application of the hinge assembly of CN 114762025A, the elastic force of the first and the second spring can only act on one side surface 321, 322 of the first and the second arm via a stopper 360, so that there is a frictional force between the stopper 360 and the side surface of the first and the second arm. However, the frictional force provided by only one side surface of the first and the second arm is relatively small, which can hardly hold the two brackets 311, 312 to any desired folding or expending angular position to thereby form a limit and shortcoming in practical application of the hinge assembly.

In view of the above disadvantages of the conventional hinge mechanism in practical application thereof, it is tried by the inventor to develop a torque module for hinge device to overcome the disadvantages in the prior art hinge mechanism.

SUMMARY OF THE INVENTION

A primary object of the present invention is to provide an improved torque module for hinge device. The torque module includes a holding support having two pivotal connection sections respectively have a pin extending therethrough; and two swing arm assemblies that are fitted on the pins to extend parallelly and be located adjacent to each other perpendicular to the holding support. The two swing arm assemblies respectively include a pair of primary swing arms and a pair of secondary swing arms, which are partially in contact with two axially opposite sides of the pivotal connection sections to clamp the latter between them, while a gap is formed between the primary and the secondary swing arms. At least one elastic element is fitted on each of the pins to push the pivotal connection sections against at least one of the pair of the primary swing arms and the pair of the secondary swing arms, so that the primary and the secondary swing arms are in firm and frictional contact with the holding support to elastically clamp to the two axially opposite sides of the pivotal connection sections, and a torque can be provided to always hold the primary and the secondary swing arms in place relative to the pivotal connection sections, no matter how the pair of the primary and the secondary swing arms are respectively folded or extended relative to each other.

Another object of the present invention is to provide the above torque module for hinge device, the secondary swing arms of which are provided on respective one side facing toward the primary swing arms with a recessed section for fitting on an edge of the pivotal connection section. In the case the recessed section has a depth smaller than a thickness of the pivotal connection section, the primary and the secondary swing arms are blocked by the pivotal connection sections from contact with one another to thereby form the gap between them. On the other hand, in the case the recessed section has a depth not smaller than the thickness of the pivotal connection section, at least one spacer can be disposed between the pivotal connection sections and at least one pair of the primary and the secondary swing arms, so that the pivotal connection section in combination with the spacer has an overall thickness larger than the depth of the recessed section to ensure a gap is formed between the primary and the secondary swing arms. Therefore, the torque module may have a variety of combinations in terms of its overall structure to meet actual need in use.

A further object of the present invention is to provide the above torque module for hinge device, which includes swing arm assemblies consisting of a pair of primary swing arms and a pair of secondary swing arms that are structurally and configurationally simplified, compared to the conventional swing arm that has a one-piece structural body. Therefore, it is able to effectively lower the difficulty in forming the parts and ensure upgraded production yield and product quality.

To achieve the above and other objects, the torque module for hinge device according to the present invention includes a holding support, two swing arm assemblies, and at least two elastic elements. The holding support has two pivotal connection sections, each of which has a pin pivotally extending therethrough. The two swing arm assemblies are pivotally connected to the two pins and include a pair of primary swing arms and a pair of secondary swing arms; the primary swing arms and the secondary swing arms are extended parallelly and located adjacent to each other in a direction perpendicular to the pins; the primary swing arms respectively have a first clamping surface in contact with one side of the pivotal connection sections, and the secondary swing arms respectively have a second clamping surface in contact with another axially opposite side of the pivotal connection sections; and a gap is formed between the primary swing arms and the secondary swing arms when the primary swing arms and the secondary swing arms are pressed against the two axially opposite sides of the pivotal connection sections. At least one elastic element is fitted on each of the pins to elastically press the pivotal connection sections against at least one of the pair of primary swing arms and the pair secondary swing arms, such that the first clamping surfaces of the primary swing arms and/or the second clamping surfaces of the secondary swing arms are elastically pressed against the two axially opposite sides of the pivotal connection sections to clamp the pivotal connection sections between them and a torque can be provided to locate the two swing arm assemblies in place relative to the holding support, no matter how the pair of two primary swing arms and the pair of two secondary swing arms are respectively turned or folded relative to each other about the pivotal connection sections.

In an embodiment of the present invention, the secondary swing arms are provided on respective one side facing toward the primary swing arms with a recessed section for fitting on an edge of the pivotal connection sections. The recessed sections have a depth smaller than a thickness of the pivotal connection sections, so that the secondary swing arms are blocked by the pivotal connection sections from fully contacting with the primary swing arms when the first clamping surfaces and the second clamping surfaces are pressed against the two axially opposite sides of the pivotal connection sections to accordingly, form the gap between the primary swing arms and the secondary swing arms.

Alternatively, in another embodiment of the present invention, the secondary swing arms are provided on respective one side facing toward the primary swing arms with a recessed section for fitting on an edge of the pivotal connection sections, and the recessed sections have a depth not smaller than a thickness of the pivotal connection sections, and at least one spacer is disposed between at least one of the first and the second clamping surfaces and the pivotal connection sections; such that the pivotal connection sections in combination with the spacer block the primary swing arms and the secondary swing arms from fully contacting with each other when the first clamping surfaces and the second clamping surfaces are pressed against the two axially opposite sides of the pivotal connection sections to accordingly, form the gap between the primary swing arms and the secondary swing arms.

In the present invention, the primary swing arms are provided on respective one end with a pin hole for fitting on around the pins, and on respective one side facing toward the secondary swing arms with a mating coupling section. The secondary swing arms are provided on respective one end with a pin hole for fitting on around the pins, and on respective one side facing toward the primary swing arms with a coupling section corresponding to the mating coupling section. The secondary swing arms and the primary swing arms are movable synchronously through engagement of the coupling sections with the mating coupling sections.

In the present invention, the two primary swing arms have a toothed section provided on an edge of respective one end having the pin hole, and have a gear set consisting of two gears provided therebetween. The two primary swing arms are foldable or extendable synchronously relative to the holding support through meshing of the gears of the gear set with the toothed sections.

In the present invention, the primary swing arms respectively include a plurality of cams formed on one side facing away from the first clamping surface and have a first cam holder located to one side thereof and fitted on the pins, and the first cam holder is provided with a plurality of cams for engaging with the cams on the primary swing arms. And, the secondary swing arms respectively include a plurality of cams formed on one side facing away from the second clamping surface and have a second cam holder located to one side thereof and fitted on the pins, and the second cam holder is provided with a plurality of cams for engaging with the cams on the secondary swing arms.

In the present invention, the elastic elements are fitted on around the pins at a position close to one side of the secondary swing arms, and a coupling seat is fitted on the pins adjacent to an end of the springs facing away from the second cam holder. The elastic elements drive the coupling seat synchronously, and the elastic force of the elastic elements is transferred synchronously via the two pins to the first cam holder and the second cam holder.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
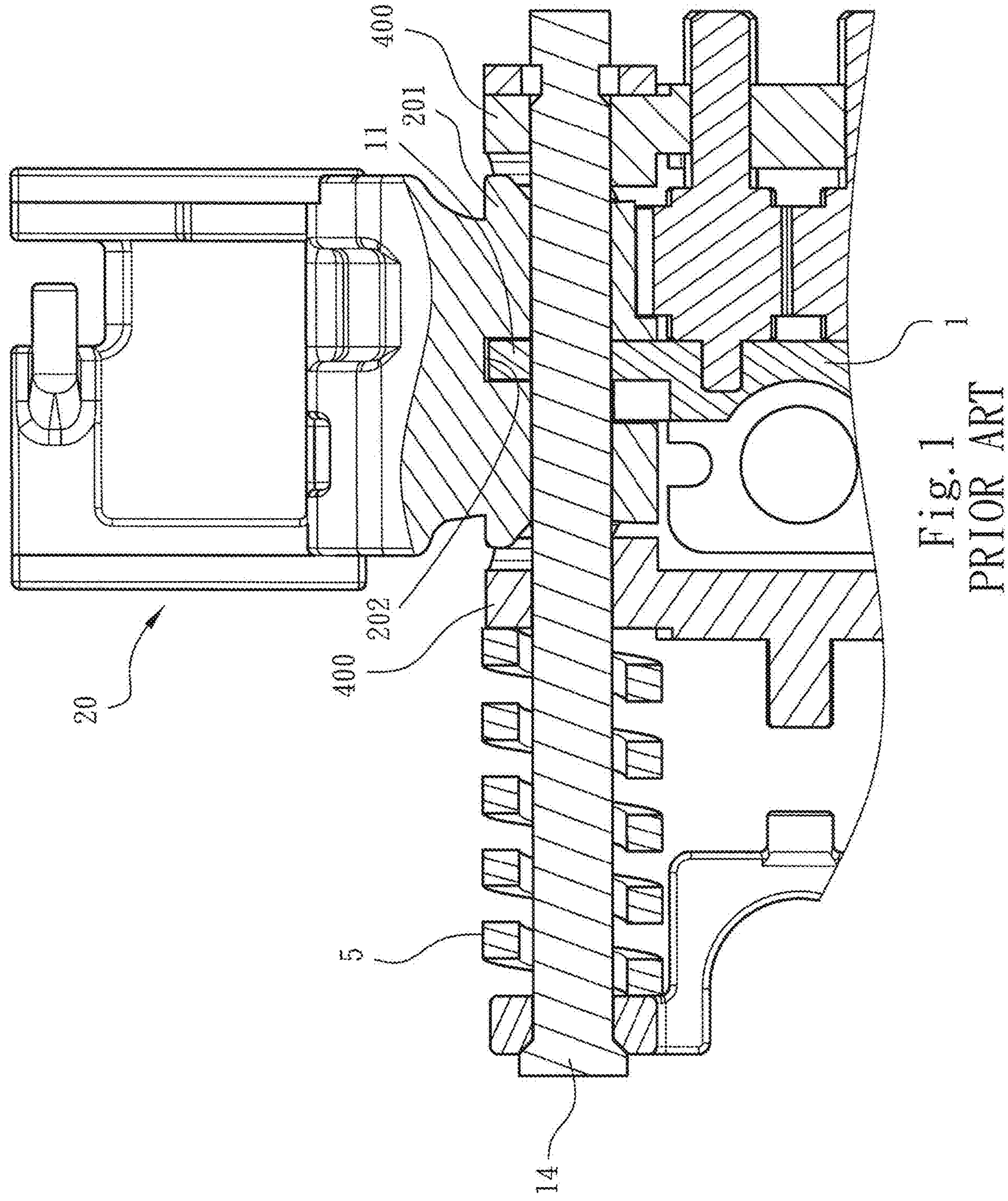
Fig. 1 PRIOR ART
FIG. 1 is a fragmentary, assembled sectional side view of a conventional hinge mechanism applied to a flexible display.

The present invention will now be described with some preferred embodiments thereof and by referring to the accompanying drawings. For the purpose of easy to understand, elements that are the same in the preferred embodiments are denoted by the same reference numerals.

Figure 2:
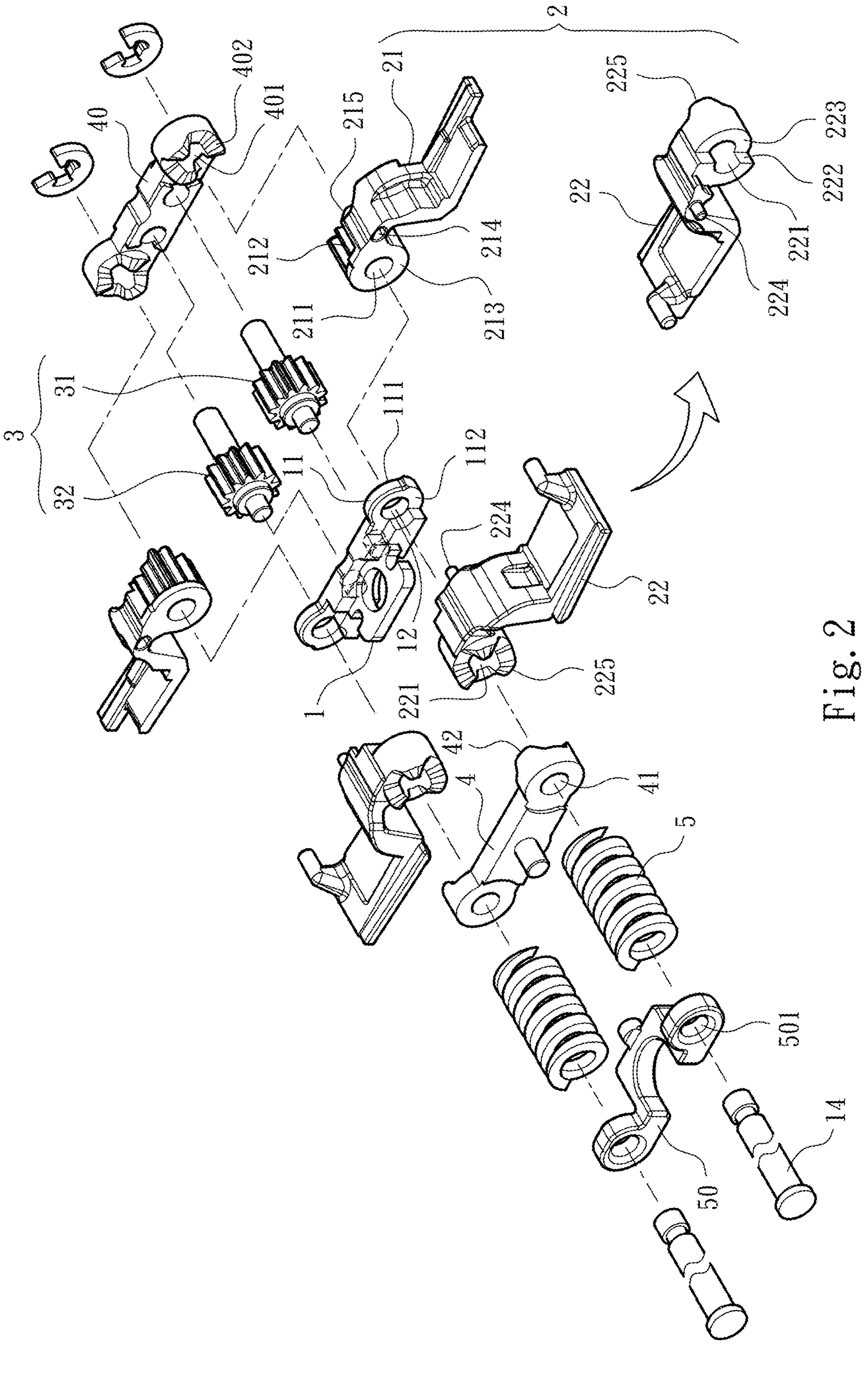
FIG. 2 is an exploded perspective view of a torque module for hinge device according to a first embodiment of the present invention.
Figure 3:
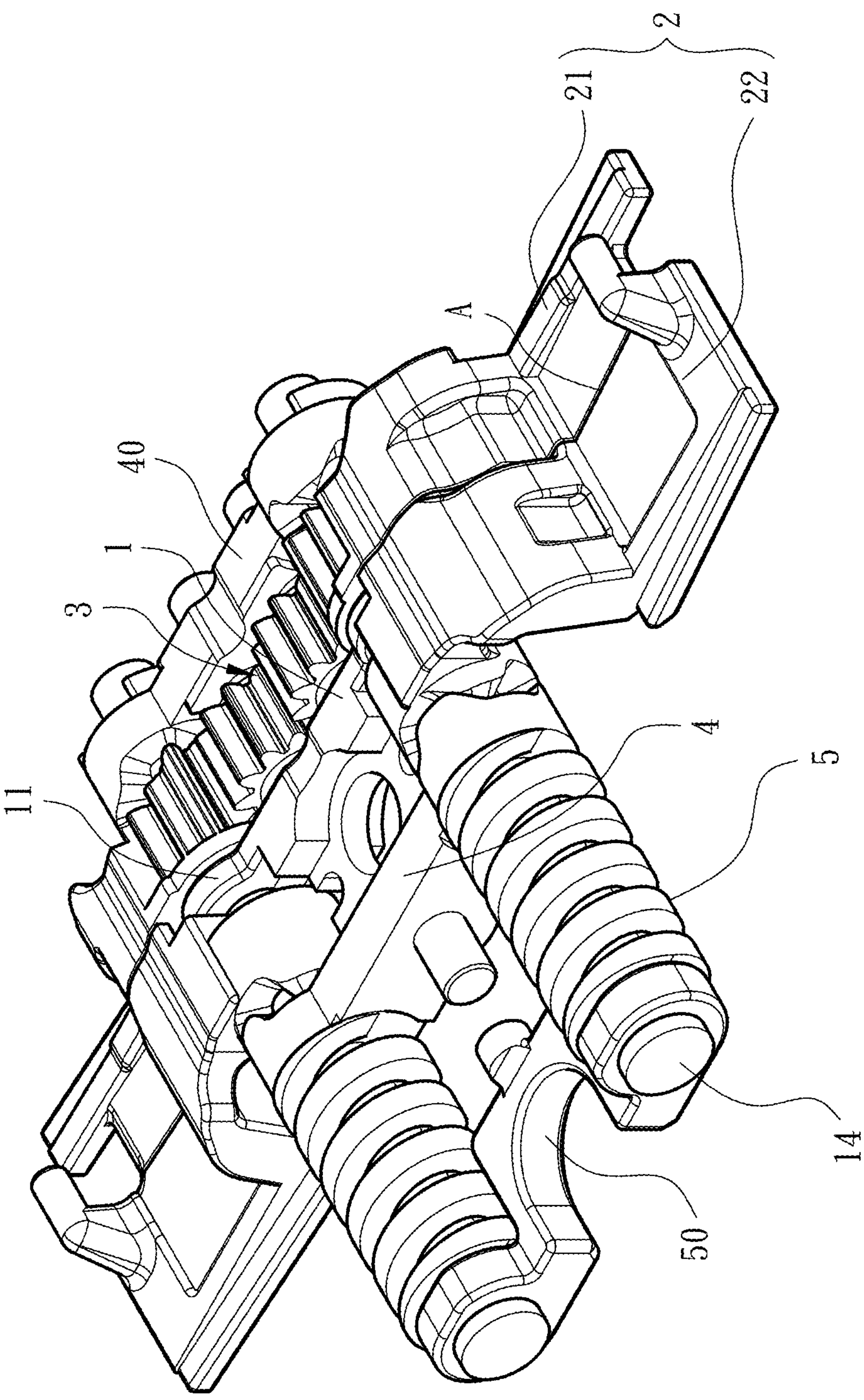
FIG. 3 is an assembled perspective view of the torque module of FIG. 2.
Figure 4:
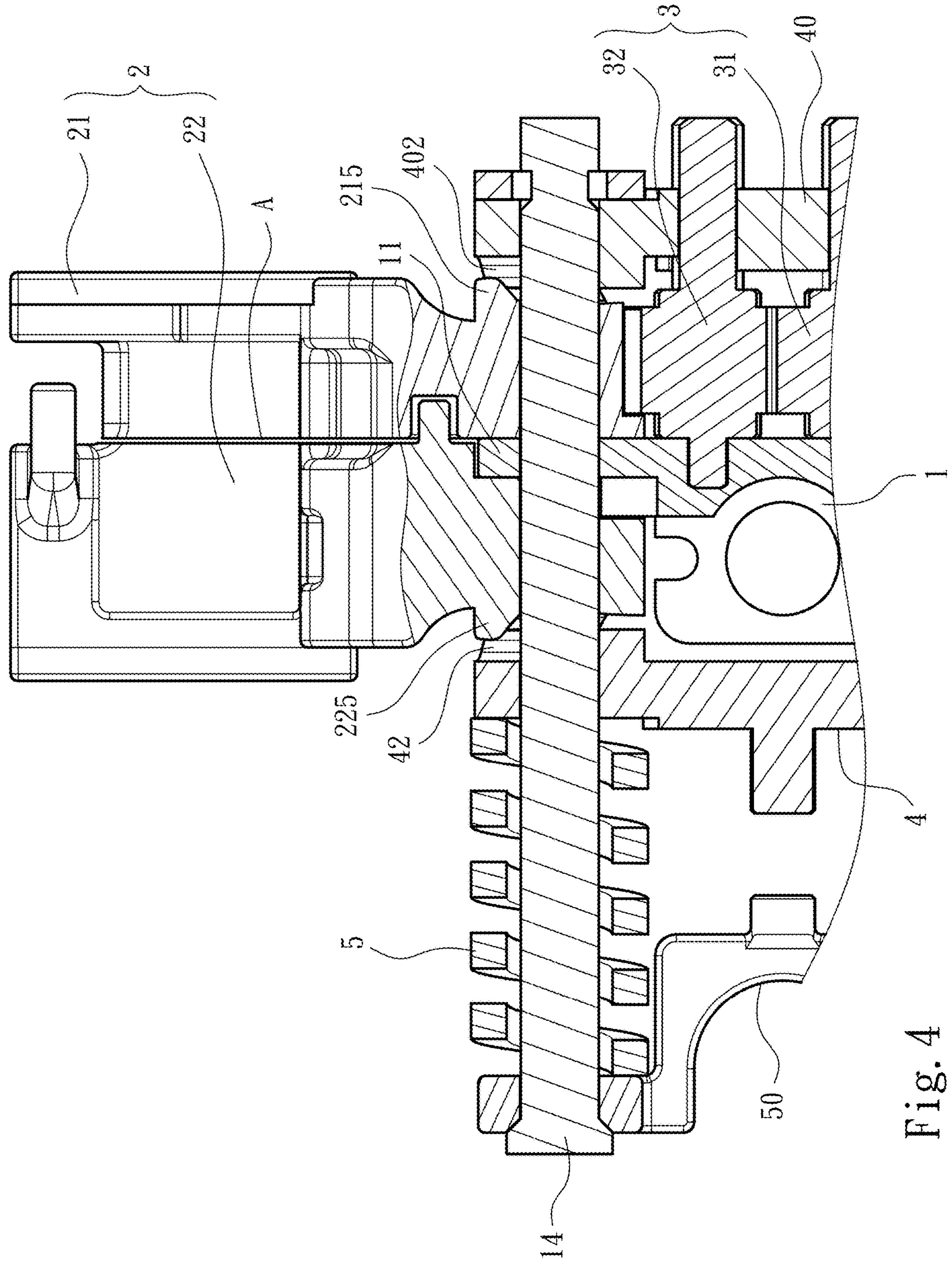
FIG. 4 is a fragmentary, assembled sectional side view of the torque module according to the first embodiment of the present invention.

Please refer to FIGS. 2 to 4, in which a torque module for hinge device according to a first embodiment of the present invention is shown. For the purpose of conciseness, the present invention is also briefly referred to as the torque module herein. As shown, the torque module mainly includes a holding support 1, two swing arm assemblies 2, and two elastic elements 5. The holding support 1 includes two pivotal connection sections 11, each of which has a centered pivotal hole 12 formed thereon; and two parallel pins 14 respectively pivotally extending through the pivotal holes 12. The pivotal connection sections 11 respectively have a first side 111 and a second side 112, which are located opposite to each other in an axial direction of the pin 14.

The two swing arm assemblies 2 include a pair of primary swing arms 21 and a pair of secondary swing arms 22. The primary swing arms 21 and the secondary swing arms 22 extend in a direction perpendicular to the pin 14, and they are located parallelly and adjacent to each other. Each of the primary arms 21 has an inner end provided with a pin hole 211 for fitting on around the pin 14, such that the primary swing arms 21 are pivotally connected to one side of the pivotal connection sections 11. The primary swing arms 21 respectively have a first clamping surface 213 that is in contact with the first side 111. Another surface of each primary swing arm 21 facing away from the first clamping surface 213 can be provided with a plurality of cams 215 according to actual need.

In a feasible embodiment, each of the primary swing arms 21 includes a toothed section 212 formed on an edge of the end near the pin hole 211; and a gear set 3 consisting of gears 31, 32 is provided between the two primary swing arms 21 to mesh with the toothed sections 212 on the primary swing arms 21, such that the two primary swing arms 21 can be synchronously folded or extended relative each other via the gear set 3.

Each of the secondary swing arms 22 has an inner end provided with a pin hole 221 for fitting on around the pin 14, such that the secondary swing arms 22 are pivotally connected to another side of the pivotal connection sections 11. The secondary swing arms 22 respectively have a second clamping surface 223 that is in contact with the second side 112. Another surface of each secondary swing arm 22 facing away from the second clamping surface 223 can be provided with a plurality of cams 225 according to actual need.

In the above described structure, each of the primary swing arms 21 is provided on the surface facing toward the secondary swing arm 22 with a mating coupling section 214, which may be a recess; and each of the secondary swing arms 22 is provided with a coupling section 224, which may be a protrusion, corresponding to the mating coupling section 214. When the coupling sections 224 are engaged with the mating coupling sections 214, the secondary swing arms 22 can move synchronously with the primary swing arms 21.

In the first embodiment, each of the secondary swing arms 22 has a recessed section 222 provided on one side facing toward the primary swing arm 21 for fitting on an edge of the pivotal connection section 11. The recessed section 222 has a depth smaller than a thickness of the pivotal connection section 11; and the second clamping surface 223 is located in the recessed section 222. When the first clamping surface 213 and the second clamping surface 223 are pressed against the first side 111 and the second side 112 of the pivotal connection section 11, respectively, the secondary swing arm 22 is blocked by the pivotal connection section 11 from fully attaching to the primary swing arm 21, and there is a gap A (see FIGS. 3 and 4) existing between the primary and the secondary swing arm 21, 22.

Each of the elastic elements 5 is fitted on around the pin 14 and has an elastic force pressing the pivotal connection section 11 against at least one of the primary and the secondary swing arm 21, 22, so that the primary swing arm 21 and the secondary swing arm 22 can approach the pivotal connection section 11 for their first clamping surface 213 and second clamping surface 223 to elastically contact with the first side 111 and the second side 112 of the pivotal connection section 11, respectively. With these arrangements, a sufficient torque can always be provided to locate the swing arm assemblies 2 in place relative to the holding support 1, no matter how the primary and secondary swing arms 21, 22 of the swing arm assemblies 2 are pivotally turned or folded relative to each other about the holding support 1.

In an operable embodiment, the elastic element 5 is fitted on around the pin 14 at a position closer to one side of the secondary swing arm 22, and a second cam holder 4 is disposed between the elastic elements 5 and the secondary swing arms 22. The second cam holder 4 is provided with pin holes 41 for fitting on the pins 14 and includes a plurality of cams 42 for engaging with the cams 225 on the secondary swing arms 22. Further, each of the primary swing arms 21 has a first cam holder 40 disposed on one side thereof facing away from the secondary swing arm 22. The first cam holder 40 is provided with pin holes 401 for fitting on around the pins 14 and includes a plurality of cams 402 for engaging with the cams 215 on the primary swing arm 21. Depending on actual need, a coupling seat 50 can be provided at one end of the elastic element 5 facing away from the second cam holder 4. The coupling seat 50 is provided with through holes 501 for fitting on around the pins 14.

When the torque module with the above structure is in an assembled state for use, the coupling seat 50 is driven by an elastic force of the two elastic elements 5, and the elastic force of the two elastic elements 5 is transferred via the two pins 14 to the first and the second cam holder 40, 4 synchronously, such that the first and the second cam holder 40, 4 are brought to push against the primary swing arms 21 and the secondary swing arms 22, respectively. As a result, the first clamping surfaces 213 and the second clamping surfaces 223 exert positive pressure on the first side 111 and the second side 112 of the pivotal connection sections 11, respectively. And, a frictional resistance between the first clamping surfaces 213 of the primary swing arms 21 and the first side 111 of the pivotal connection sections 11 as well as between the second clamping surfaces 223 of the secondary swing arms 22 and the second side 112 of the pivotal connection sections 11 enables a tight contact of the first and the second clamping surfaces 213, 223 with the first and the second side 111, 112, respectively.

Figure 5:
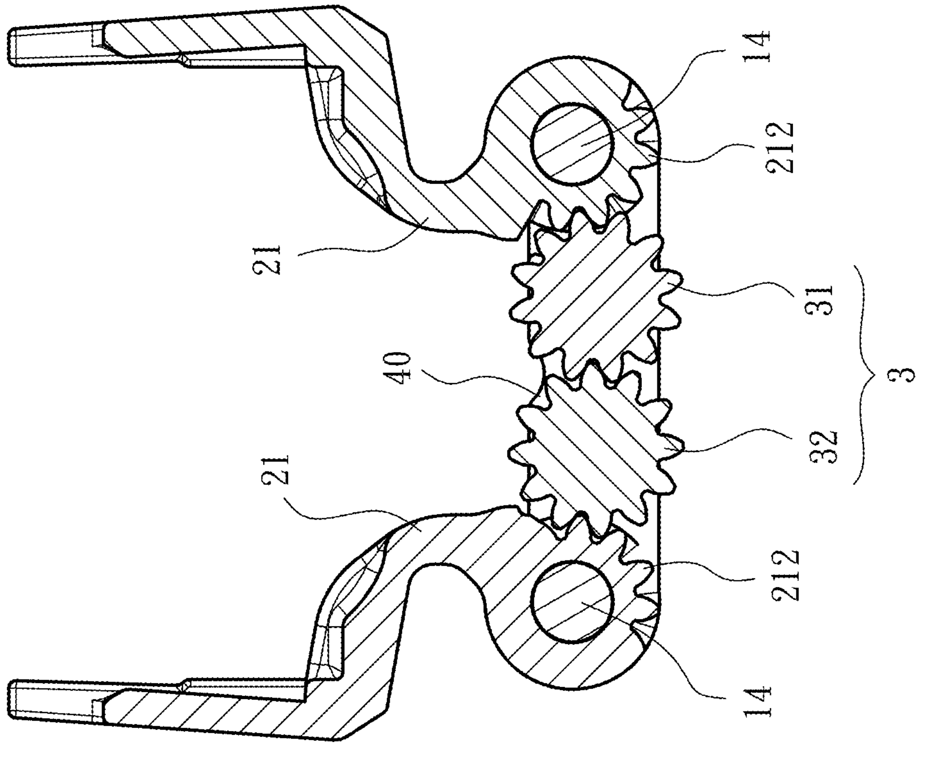
FIG. 5 is a first view showing the manner of operation of the torque module for hinge device according to the first embodiment of the present invention, in which a swing arm assembly is in a fully folded state with two swing arms thereof located at two laterally opposite ends of a holding support and extending in parallel with each other.
Figure 6:
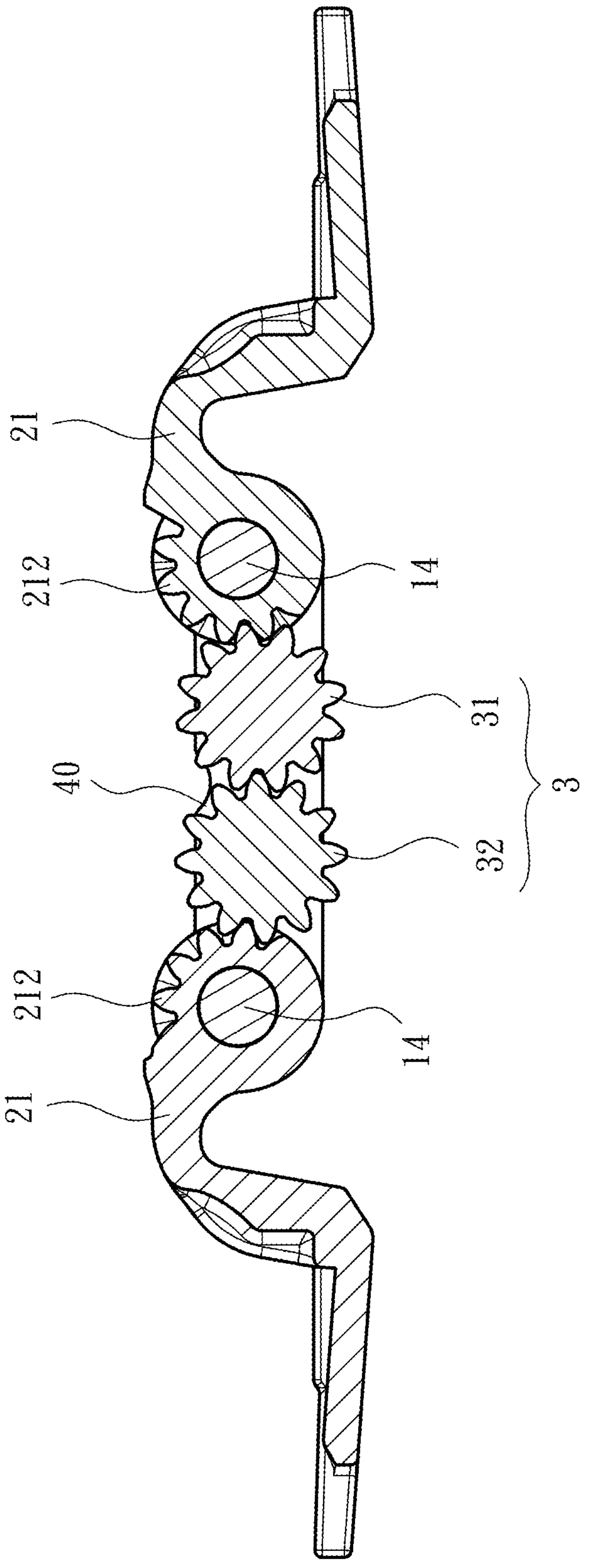
FIG. 6 is a second view showing the manner of operation of the torque module for hinge device according to the first embodiment of the present invention, in which the swing arm assembly is in a fully extended state with the two swing arms thereof located at two laterally opposite ends of the holding support and extending in two opposite directions.
Figure 7:
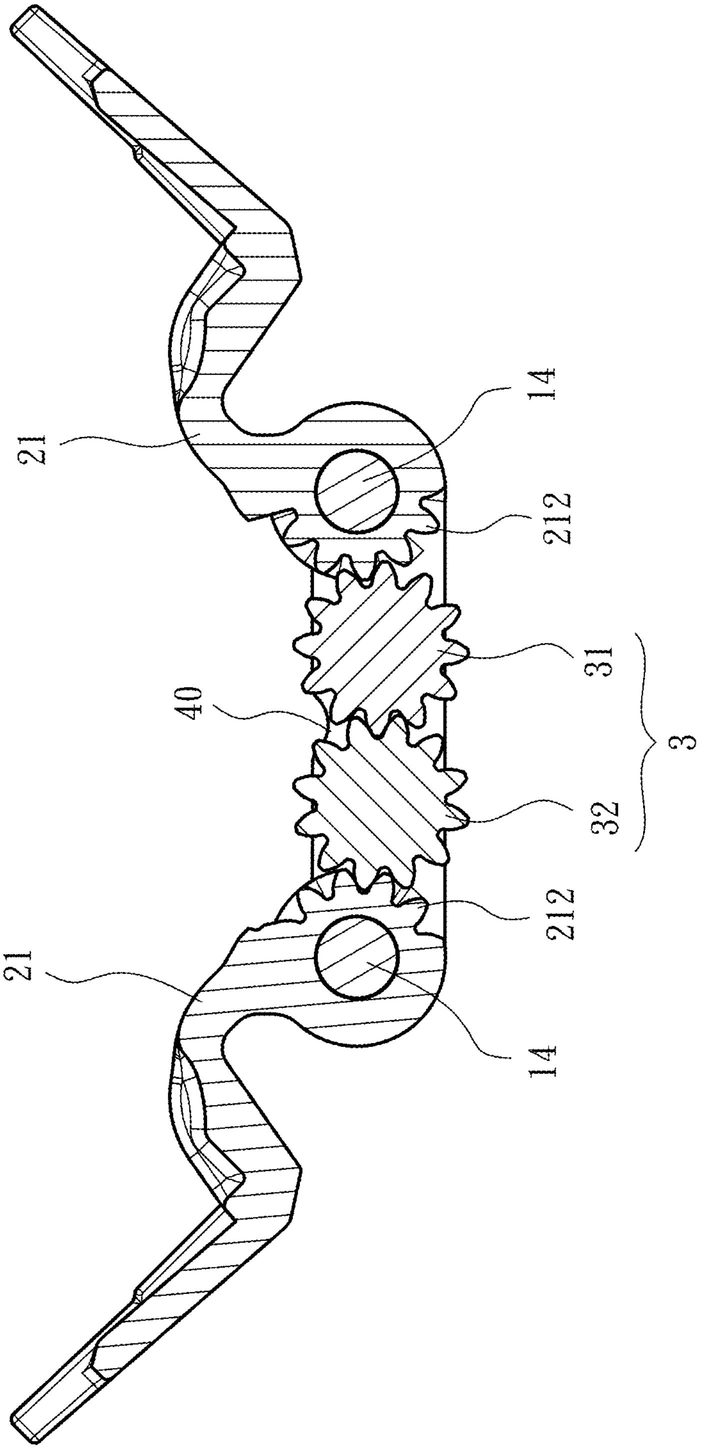
FIG. 7 is a third view showing the manner of operation of the torque module for hinge device according to the first embodiment of the present invention, in which the swing arm assembly is in a partially folded state with the two swing arms thereof located at two laterally opposite ends of the holding support and including between them any desired angle larger than zero and smaller than 180 degrees.

Please refer to FIGS. 5 to 7, which show the manner of operation of the torque module for hinge device according to the first embodiment of the present invention. The swing arm assemblies 2 can be moved to a fully folded state, in which both the two primary swing arms 21 and the two secondary swing arms 22 are located side by side at two laterally opposite ends of the holding support 1 to extend parallelly in the same direction, as shown in FIG. 5. At this point, the cams 215 on the primary swing arms 21 are engaged with one of the cams 402 on the first cam holder 40, and the cams 225 on the secondary swing arms 22 are engaged with one of the cams 42 on the second cam holder 4. On the other hand, the swing arm assemblies 2 can be otherwise moved to a fully extended state, in which both the two primary swing arms 21 and the two secondary swing arms 22 are located at two laterally opposite ends of the holding support 1 to extend in two opposite directions, as shown in FIG. 6. At this point, the cams 215 on the primary swing arms 21 are engaged with another cam 402 on the first cam holder 40, and the cams 225 on the secondary swing arms 22 are engaged with another cam 42 on the second cam holder 4.

The swing arm assemblies 2 may also be in a partially folded state, in which both the primary swing arms 21 and the secondary swing arms 22 are located at two laterally opposite ends of the holding support 1 to include between them any desired angle larger than zero and smaller than 180 degrees, as shown in FIG. 7. At this point, the cams 215 on the primary swing arms 21 are located between two cams 402 on the first cam holder 40, and the cams 225 on the secondary swing arms 22 are located between two cams 42 on the second cam holder 4. When the torque module is in the partially folded state, the elastic force of the two elastic elements 5 is transferred via the cam holders 40, 4 to act on the primary and the secondary swing arms 21, 22, such that the first and the second clamping surfaces 213, 223 of the primary and the secondary swing arms 21, 22, respectively, exert positive pressure against the first side 111 and the second side 112, and there is a frictional resistance between the primary and secondary swing arms 21, 22 and the pivotal connection sections 11. Therefore, the primary and the secondary swing arms 21, 22 of the swing arm assemblies 2 can be located at two laterally opposite ends of the holding support 1 to stay at any position between the fully folded and the fully extended state and have an angle larger than zero and smaller than 180 degrees included between them. With these arrangements, the torque module of the present invention can have a wider range of applications.

Figure 8:
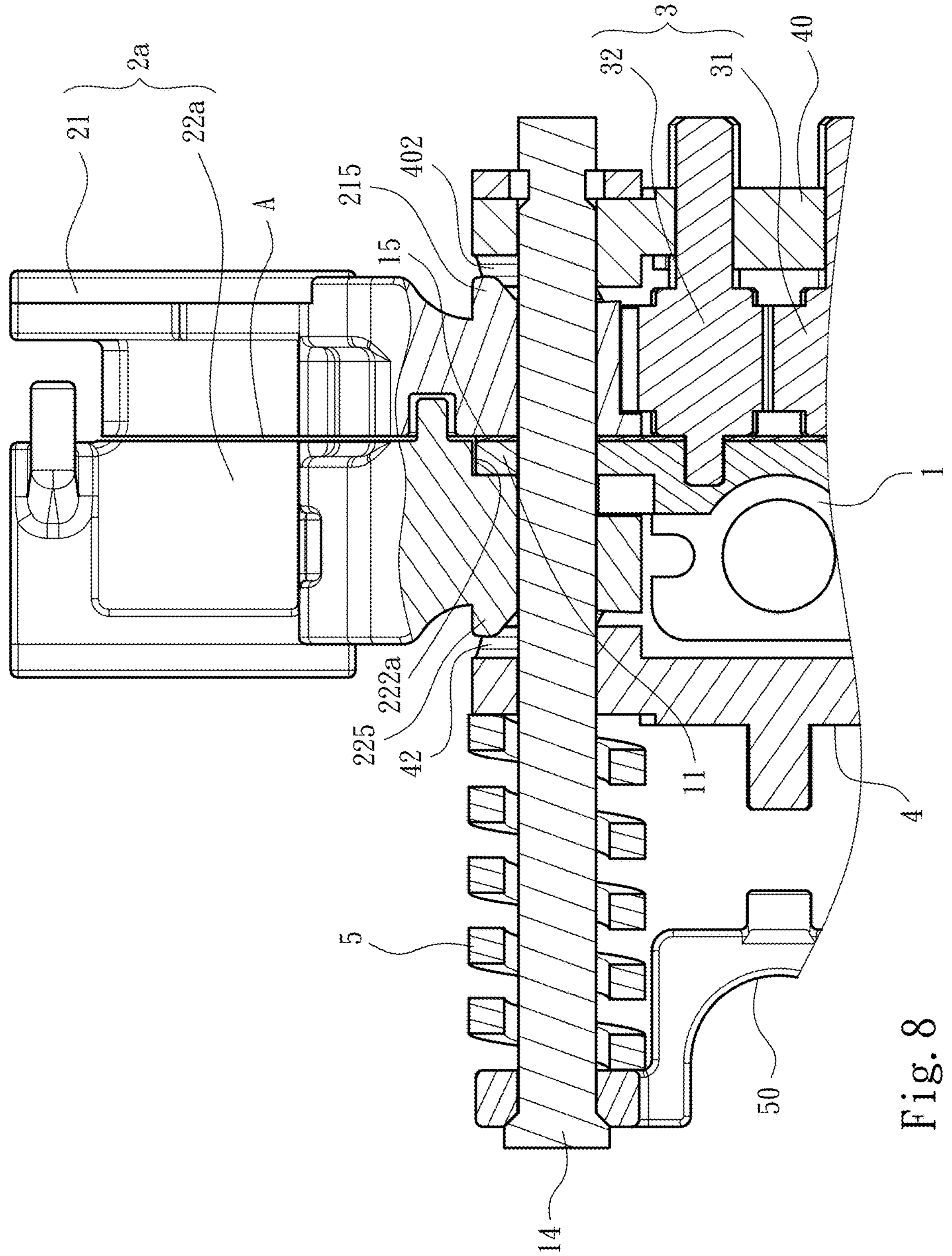
FIG. 8 is a fragmentary, assembled sectional side of a torque module for hinge device according to a second embodiment of the present invention.

Please refer to FIG. 8. A torque module for hinge device according to a second embodiment includes two swing arm assemblies **2*a* consisting of a pair of primary swing arms 21 and a pair of secondary swing arms 22*a*, a holding support 1, and two elastic elements 5. The primary swing arms 21, the holding support 1 and the elastic elements 5 are the same in the first and the second embodiment. The secondary swing arms 22*a* are different from the secondary swing arms 22 in that each of the secondary swing arm 22*a* is formed on one side facing toward the primary swing arm 21 with a recessed section 222*a* for fitting on an edge of the pivotal connection section 11, and the recessed section 222*a* has a depth not smaller than the thickness of the pivotal connection section 11; and that at least one spacer 15, a wash, or any other similar material is provided between the first clamping surfaces 213 and the first side 111 or between the second clamping surfaces 223 and the second side 112 of the pivotal connection sections 11, such that an overall thickness of the spacer 15 in combination with the pivotal connection section 11 is larger than the depth of the recessed section 222*a* for forming a gap A between the primary swing arms 21 and the secondary swing arms 22*a*. Since the remaining parts of the secondary swing arms 22*a* are structurally and operationally the same as the secondary swing arms 22**, they are not repeatedly described herein.

In conclusion, the torque module for hinge device according to the present invention indeed has the advantages of creating tight clamping and frictional contact of the swing arm assembly 2 on/with the holding support 1, so that a sufficient torque can always be provided to locate the primary and the secondary swing arms 21, 22 of the swing arm assemblies 2 in place relative to the holding support 1, no matter how the pair of primary swing arms 21 and the pair of secondary swing arms 22 of the swing arm assemblies 2 are respectively turned or folded relative to each other about the holding support 1 to include any desired angle between them. Therefore, the present invention meets the requirements of novelty and improvement for granting a patent. It is also understood the present invention has been described with some preferred embodiments thereof and many changes and modifications in the described embodiments can be carried out without departing from the scope and the spirit of the invention that is intended to be limited only by the appended claims.

What is claimed is:

1. A torque module for hinge device, comprising:

a holding support (1) having two pivotal connection sections (11), each of said two pivotal connection sections having a pin (14) pivotally extending therethrough;

two swing arm assemblies (2, 2*a*) pivotally connected to the two pins (14) and including a pair of primary swing arms (21) and a pair of secondary swing arms (22, 22*a*); the primary swing arms (21) and the secondary swing arms (22, 22*a*) being extended in parallel and located adjacent to each other in a direction perpendicular to the pins (14); the primary swing arms (21) respectively having a first clamping surface (213) in contact with one side of the pivotal connection sections (11), and the secondary swing arms (22, 22*a*) respectively having a second clamping surface (223) in contact with another axially opposite side of the pivotal connection sections (11); and a gap (A) being formed between the primary swing arms (21) and the secondary swing arms (22, 22*a*) when the primary swing arms (21) and the secondary swing arms (22, 22*a*) are pressed against the two axially opposite sides of the pivotal connection sections (11); and at least one elastic element (5) fitted on each of the pins (14) to elastically press the pivotal connection sections (11) against at least one of the pair of primary swing arms (21) and the pair of secondary swing arms (22, 22*a*), such that the first clamping surfaces (213) of the primary swing arms (21) and the second clamping surfaces (223) of the secondary swing arms (22, 22*a*) are elastically pressed against the two axially opposite sides of the pivotal connection sections (11) to clamp the pivotal connection sections (11) therebetween, and a torque is provided to locate the two swing arm assemblies (2, 2*a*) in place relative to the holding support (1), no matter how the two primary swing arms (21) and the two secondary swing arms (22, 22*a*) are respectively turned or folded relative to each other about the pivotal connection sections (11), wherein the primary swing arms (21) are provided on respective one end with a pin hole (211) for fitting on around the pins (14), and on a respective one side facing toward the secondary swing arms (22, 22*a*) with a mating coupling section (214); and the secondary swing arms (22, 22*a*) being provided on respective one end with a pin hole (221) for fitting on around the pins (14), and on respective one side facing toward the primary swing arms (21) with a coupling section (224) corresponding to the mating coupling section (214); and the secondary swing arms (22, 22*a*) and the primary swing arms (21) being movable synchronously through engagement of the coupling sections (224) with the mating coupling sections (214).

2. The torque module for hinge device as claimed in claim 1, wherein the secondary swing arms (22) are provided on respective one side facing toward the primary swing arms (21) with a recessed section (222) for fitting on an edge of the pivotal connection sections (11); the recessed sections (222) having a depth smaller than a thickness of the pivotal connection sections (11), so that the secondary swing arms (22) are blocked by the pivotal connection sections (11) from fully contacting with the primary swing arms (21) when the first clamping surfaces (213) and the second clamping surfaces (223) are pressed against the two axially opposite sides of the pivotal connection sections (11) to accordingly, form the gap (A) between the primary swing arms (21) and the secondary swing arms (22).

3. The torque module for hinge device as claimed in claim 2, wherein the primary swing arms (21) are provided on respective one end with a pin hole (211) for fitting on around the pins (14), and on respective one side facing toward the secondary swing arms (22, 22*a*) with a mating coupling section (214); and the secondary swing arms (22, 22*a*) being provided on respective one end with a pin hole (221) for fitting on around the pins (14), and on respective one side facing toward the primary swing arms (21) with a coupling section (224) corresponding to the mating coupling section (214); and the secondary swing arms (22, 22*a*) and the primary swing arms (21) being movable synchronously through engagement of the coupling sections (224) with the mating coupling sections (214).

4. The torque module for hinge device as claimed in claim 3, wherein the primary swing arms (21) respectively include a plurality of cams (215) formed on one side facing away from the first clamping surface (213) and have a first cam holder (40) located to one side thereof and fitted on the pins (14), and the first cam holder (40) being provided with a plurality of cams (402) for engaging with the cams (215) on the primary swing arms (21); and wherein the secondary swing arms (22, 22*a*) respectively include a plurality of cams (225) formed on one side facing away from the second clamping surface (223) and have a second cam holder (4) located to one side thereof and fitted on the pins (14), and the second cam holder (4) being provided with a plurality of cams (42) for engaging with the cams (225) on the secondary swing arms (22, 22*a*).

5. The torque module for hinge device as claimed in claim 4, wherein the elastic elements (5) are fitted on around the pins (14) at a position close to one side of the secondary swing arms (22, 22*a*), and have a coupling seat (50) located to an end thereof facing away from the second cam holder (4) for fitting on the pins (14); and the elastic elements (5) driving the coupling seat (50) synchronously, and the elastic force of the elastic elements (5) being transferred synchronously via the two pins (14) to the first cam holder (40) and the second cam holder (4).

6. The torque module for hinge device as claimed in claim 2, wherein the primary swing arms (21) respectively include a plurality of cams (215) formed on one side facing away from the first clamping surface (213) and have a first cam holder (40) located to one side thereof and fitted on the pins (14), and the first cam holder (40) being provided with a plurality of cams (402) for engaging with the cams (215) on the primary swing arms (21); and wherein the secondary swing arms (22, 22*a*) respectively include a plurality of cams (225) formed on one side facing away from the second clamping surface (223) and have a second cam holder (4) located to one side thereof and fitted on the pins (14), and the second cam holder (4) being provided with a plurality of cams (42) for engaging with the cams (225) on the secondary swing arms (22, 22*a*).

7. The torque module for hinge device as claimed in claim 6, wherein the elastic elements (5) are fitted on around the pins (14) at a position close to one side of the secondary swing arms (22, 22*a*), and have a coupling seat (50) located to an end thereof facing away from the second cam holder (4) for fitting on the pins (14); and the elastic elements (5)

driving the coupling seat (50) synchronously, and the elastic force of the elastic elements (5) being transferred synchronously via the two pins (14) to the first cam holder (40) and the second cam holder (4).

8. The torque module for hinge device as claimed in claim 1, wherein the two primary swing arms (21) have a toothed section (212) provided on an edge of respective one end having the pin hole (211), and have a gear set (3) consisting of two gears (31), (32) provided therebetween; and the two primary swing arms (21) being foldable or extendable synchronously relative to the holding support (1) through meshing of the gears (31, 32) of the gear set (3) with the toothed sections (212).

9. The torque module for hinge device as claimed in claim 8, wherein the primary swing arms (21) respectively include a plurality of cams (215) formed on one side facing away from the first clamping surface (213) and have a first cam holder (40) located to one side thereof and fitted on the pins (14), and the first cam holder (40) being provided with a plurality of cams (402) for engaging with the cams (215) on the primary swing arms (21); and wherein the secondary swing arms (22, 22*a*) respectively include a plurality of cams (225) formed on one side facing away from the second clamping surface (223) and have a second cam holder (4) located to one side thereof and fitted on the pins (14), and the second cam holder (4) being provided with a plurality of cams (42) for engaging with the cams (225) on the secondary swing arms (22, 22*a*).

10. The torque module for hinge device as claimed in claim 9, wherein the elastic elements (5) are fitted on around the pins (14) at a position close to one side of the secondary swing arms (22, 22*a*), and have a coupling seat (50) located to an end thereof facing away from the second cam holder (4) for fitting on the pins (14); and the elastic elements (5) driving the coupling seat (50) synchronously, and the elastic force of the elastic elements (5) being transferred synchronously via the two pins (14) to the first cam holder (40) and the second cam holder (4).

11. The torque module for hinge device as claimed in claim 1, wherein the primary swing arms (21) respectively include a plurality of cams (215) formed on one side facing away from the first clamping surface (213) and have a first cam holder (40) located to one side thereof and fitted on the pins (14), and the first cam holder (40) being provided with a plurality of cams (402) for engaging with the cams (215) on the primary swing arms (21); and wherein the secondary swing arms (22, 22*a*) respectively include a plurality of cams (225) formed on one side facing away from the second clamping surface (223) and have a second cam holder (4) located to one side thereof and fitted on the pins (14), and the second cam holder (4) being provided with a plurality of cams (42) for engaging with the cams (225) on the secondary swing arms (22, 22*a*).

12. The torque module for hinge device as claimed in claim 11, wherein the elastic elements (5) are fitted on around the pins (14) at a position close to one side of the secondary swing arms (22, 22*a*), and have a coupling seat (50) located to an end thereof facing away from the second cam holder (4) for fitting on the pins (14); and the elastic elements (5) driving the coupling seat (50) synchronously, and the elastic force of the elastic elements (5) being transferred synchronously via the two pins (14) to the first cam holder (40) and the second cam holder (4).

13. The torque module for hinge device as claimed in claim 1, wherein the primary swing arms (21) respectively include a plurality of cams (215) formed on one side facing away from the first clamping surface (213) and have a first cam holder (40) located to one side thereof and fitted on the pins (14), and the first cam holder (40) being provided with a plurality of cams (402) for engaging with the cams (215) on the primary swing arms (21); and wherein the secondary swing arms (22, 22*a*) respectively include a plurality of cams (225) formed on one side facing away from the second clamping surface (223) and have a second cam holder (4) located to one side thereof and fitted on the pins (14), and the second cam holder (4) being provided with a plurality of cams (42) for engaging with the cams (225) on the secondary swing arms (22, 22*a*).

14. The torque module for hinge device as claimed in claim 13, wherein the elastic elements (5) are fitted on around the pins (14) at a position close to one side of the secondary swing arms (22, 22*a*), and have a coupling seat (50) located to an end thereof facing away from the second cam holder (4) for fitting on the pins (14); and the elastic elements (5) driving the coupling seat (50) synchronously, and the elastic force of the elastic elements (5) being transferred synchronously via the two pins (14) to the first cam holder (40) and the second cam holder (4).

15. A torque module for hinge device, comprising:

a holding support (1) having two pivotal connection sections (11), each of said two pivotal connection sections having a pin (14) pivotally extending therethrough;

two swing arm assemblies (2, 2*a*) pivotally connected to the two pins (14) and including a pair of primary swing arms (21) and a pair of secondary swing arms (22, 22*a*); the primary swing arms (21) and the secondary swing arms (22, 22*a*) being extended in parallel and located adjacent to each other in a direction perpendicular to the pins (14); the primary swing arms (21) respectively having a first clamping surface (213) in contact with one side of the pivotal connection sections (11), and the secondary swing arms (22, 22*a*) respectively having a second clamping surface (223) in contact with another axially opposite side of the pivotal connection sections (11); and a gap (A) being formed between the primary swing arms (21) and the secondary swing arms (22, 22*a*) when the primary swing arms (21) and the secondary swing arms (22, 22*a*) are pressed against the two axially opposite sides of the pivotal connection sections (11); and at least one elastic element (5) fitted on each of the pins (14) to elastically press the pivotal connection sections (11) against at least one of the pair of primary swing arms (21) and the pair of secondary swing arms (22, 22*a*), such that the first clamping surfaces (213) of the primary swing arms (21) and the second clamping surfaces (223) of the secondary swing arms (22, 22*a*) are elastically pressed against the two axially opposite sides of the pivotal connection sections (11) to clamp the pivotal connection sections 11) therebetween, and a torque is provided to locate the two swing arm assemblies (2, 2*a*) in place relative to the holding support (1), no matter how the two primary swing arms (21) and the two secondary swing arms (22, 22*a*) are respectively turned or folded relative to each other about the pivotal connection sections (11), wherein the secondary swing arms (22*a*) are provided on a respective one side facing toward the primary swing arms (21) with a recessed section (222*a*) for fitting on an edge of the pivotal connection sections (11); the recessed sections (222*a*) having a depth not smaller than a thickness of the pivotal connection sections (11), and at least one spacer (15) being disposed between at least one of the first and the second clamping surfaces (213, 223) and the pivotal connection sections (11); such that the pivotal connection sections (11) in combination with the spacer (15) block the primary swing arms (21) and the secondary swing arms (22*a*) from fully contacting with each other when the first clamping surfaces (213) and the second clamping surfaces (223) are pressed against the two axially opposite sides of the pivotal connection sections (11) to accordingly, form the gap (A) between the primary swing arms (21) and the secondary swing arms (22*a*).

16. The torque module for hinge device as claimed in claim 15, wherein the primary swing arms (21) are provided on respective one end with a pin hole (211) for fitting on around the pins (14), and on respective one side facing toward the secondary swing arms (22, 22*a*) with a mating coupling section (214); and the secondary swing arms (22, 22*a*) being provided on respective one end with a pin hole (221) for fitting on around the pins (14), and on respective one side facing toward the primary swing arms (21) with a coupling section (224) corresponding to the mating coupling section (214); and the secondary swing arms (22, 22*a*) and the primary swing arms (21) being movable synchronously through engagement of the coupling sections (224) with the mating coupling sections (214).

17. The torque module for hinge device as claimed in claim 16, wherein the primary swing arms (21) respectively include a plurality of cams (215) formed on one side facing away from the first clamping surface (213) and have a first cam holder (40) located to one side thereof and fitted on the pins (14), and the first cam holder (40) being provided with a plurality of cams (402) for engaging with the cams (215) on the primary swing arms (21); and wherein the secondary swing arms (22, 22*a*) respectively include a plurality of cams (225) formed on one side facing away from the second clamping surface (223) and have a second cam holder (4) located to one side thereof and fitted on the pins (14), and the second cam holder (4) being provided with a plurality of cams (42) for engaging with the cams (225) on the secondary swing arms (22, 22*a*).

18. The torque module for hinge device as claimed in claim 15, wherein the primary swing arms (21) respectively include a plurality of cams (215) formed on one side facing away from the first clamping surface (213) and have a first cam holder (40) located to one side thereof and fitted on the pins (14), and the first cam holder (40) being provided with a plurality of cams (402) for engaging with the cams (215) on the primary swing arms (21); and wherein the secondary swing arms (22, 22*a*) respectively include a plurality of cams (225) formed on one side facing away from the second clamping surface (223) and have a second cam holder (4) located to one side thereof and fitted on the pins (14), and the second cam holder (4) being provided with a plurality of cams (42) for engaging with the cams (225) on the secondary swing arms (22, 22*a*).

19. The torque module for hinge device as claimed in claim 18, wherein the elastic elements (5) are fitted on around the pins (14) at a position close to one side of the secondary swing arms (22, 22*a*), and have a coupling seat (50) located to an end thereof facing away from the second cam holder (4) for fitting on the pins (14); and the elastic elements (5) driving the coupling seat (50) synchronously, and the elastic force of the elastic elements (5) being transferred synchronously via the two pins (14) to the first cam holder (40) and the second cam holder (4).

* * * * *